United States Patent
Kanzaka et al.

[11] Patent Number: 6,095,193
[45] Date of Patent: Aug. 1, 2000

[54] SMOOTH VENT VALVE

[75] Inventors: Ikuo Kanzaka; Tsuneo Ishigaki, both of Yawara-mura, Japan

[73] Assignee: SMC Corporation, Japan

[21] Appl. No.: 09/149,799

[22] Filed: Sep. 8, 1998

[30] Foreign Application Priority Data

Sep. 22, 1997 [JP] Japan ................................. 9-273288
May 6, 1998 [JP] Japan ................................. 10-137387

[51] Int. Cl.[7] ............................................... F16K 51/02
[52] U.S. Cl. ...................... 137/637.2; 137/613; 251/121
[58] Field of Search ............................ 137/637.2, 613, 137/614.19, 637; 251/121

[56] References Cited

U.S. PATENT DOCUMENTS

| | | | |
|---|---|---|---|
| 2,401,124 | 5/1946 | Walker et al. | 137/613 |
| 3,640,311 | 2/1972 | Gotzenberger | 137/613 |
| 4,168,719 | 9/1979 | Renshaw | 137/613 |
| 5,271,427 | 12/1993 | Berchem | 137/613 |
| 5,762,086 | 6/1998 | Ollivier | 137/613 |
| 5,971,018 | 10/1999 | Karlsson et al. | 137/613 |

FOREIGN PATENT DOCUMENTS

2-229983  9/1990  Japan.
3-6175  1/1991  Japan.

*Primary Examiner*—J. Casimer Jacyna
*Attorney, Agent, or Firm*—Baker Botts L.L.P.

[57] ABSTRACT

A smooth vent valve in which an on-off valve and a flow control valve are provided in series and arranged to be capable of being operated by respective actuating mechanisms, thereby accurately performing the on-off operation of the on-off valve and the flow rate control of the flow control valve. The smooth vent valve (11) has an on-off valve (8) and a flow control valve (9), which are coaxially provided between an inlet port (18) and outlet port (19) of a valve body (13 to 15). The on-off valve (8) and the flow control valve (9) are placed in series. An actuating mechanism for the on-off valve (8) and an actuating mechanism for the flow control valve (9) are formed separately from each other. When the on-off valve is in an open position, the flow control valve can be switched between a throttling position and an open position while continuously changing the flow rate.

12 Claims, 5 Drawing Sheets

SMOOTH VENT VALVE

BACKGROUND OF THE INVENTION

The present invention relates to a smooth vent valve that supplies an inert gas into a vacuum chamber of a semiconductor manufacturing system or the like to return the pressure in the vacuum chamber from a vacuum to the atmospheric pressure in such a manner that dust attached to the floor and wall surfaces of the vacuum chamber and piping will not be whirled up by the inert gas.

Vacuum chambers of semiconductor manufacturing systems or the like include a vacuum treating chamber and a load-lock chamber (i.e. a chamber placed between a vacuum treating chamber and an atmospheric chamber). To unload wafers, for example, from the load-lock chamber into the atmospheric air, an inert gas, e.g. nitrogen gas, is supplied into the vacuum chamber (load-lock chamber), which is under vacuum, to destroy the vacuum. At this time, dust (dust particles) attached to the floor and wall surfaces of the vacuum chamber and piping may be whirled up by the injected gas and suspended in the chamber. The suspended dust particles are likely to adhere to wafers, producing an adverse effect on the performance of semiconductors. Dust is not particularly harmful if it remains attached to the floor or wall surface. Accordingly, it is common practice to use an apparatus that gradually increases the flow rate of the injected gas in order to avoid suspension of dust particles when the vacuum is destroyed.

Figure 6:
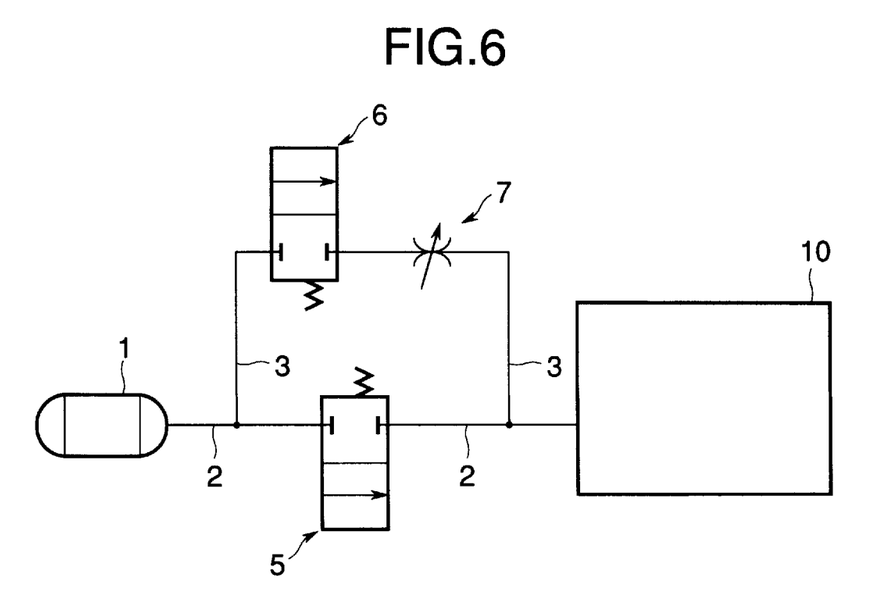
FIG. 6 is a circuit diagram showing a conventional apparatus.

FIG. 6 shows a conventional apparatus [for example, see Japanese Patent Application Unexamined Publication (KOKAI) No. 2-229983]. A gas container 1 and a vacuum chamber 10 are communicated with each other by a main passage 2 and a sub-passage 3. The main passage 2 is provided with a main valve 5. The sub-passage 3 is provided with a sub-valve 6 and a flow control valve 7, which are placed in series. At an initial stage of gas supply, the gas is supplied slowly so as not to whirl up dust by opening the sub-valve 6 and lowering the flow rate through the flow control valve 7. The main gas supply is carried out by opening the main valve 5 when the pressure in the vacuum chamber 10 has approached the atmospheric pressure to a certain extent. Thus, no dust is whirled up even if the gas is supplied at a high flow rate. Accordingly, the pressure in the vacuum chamber 10 can be raised to the atmospheric pressure within a short period of time. However, the conventional apparatus has the disadvantages that the piping becomes complicated and requires an increased space, and that the number of parts increases, resulting in an increase in the cost, and further that a leakage test must be carried out for each joint.

An L-shaped valve for vacuum apparatus, in which a main valve, a sub-valve and a flow control valve are integrated into one unit, is known as a device to be provided in an exhaust flow path for a vacuum chamber [for example, see Japanese Utility Model Application Unexamined Publication (KOKAI) No. 3-6175]. In the conventional L-shaped valve for vacuum apparatus, an annular main valve seat is placed in a flow path between an inlet and outlet ports of a valve body, and a disk-shaped main valve element is provided at a position opposite to the main valve seat. The main valve element has an orifice extending therethrough. An approximately disk-shaped auxiliary valve element is provided at the upper end of the main valve element to face opposite to the orifice. The main valve (on-off valve), which consists essentially of the main valve element and the main valve seat, is opened by separating the main valve element from the main valve seat. The main valve is closed by bringing the main valve element into contact with the main valve seat. When the main valve is closed and the auxiliary valve element is separate from the main valve element, the fluid flows through the orifice in the main valve element. When the main valve is closed and the auxiliary valve element is placed in contact with the main valve element, the orifice is also closed. The conventional L-shaped valve for vacuum apparatus is operated by actuating a handle. Therefore, the L-shaped valve is not easy to operate and incapable of controlling the flow rate of the fluid flowing through the orifice.

SUMMARY OF THE INVENTION

A first object of the present invention is to provide a smooth vent valve in which an on-off valve and a flow control valve are provided in series and arranged to be capable of being operated by respective actuating mechanisms, thereby accurately performing the on-off operation of the on-off valve and the flow rate control of the flow control valve.

A second object of the present invention is to provide a smooth vent valve in which a main shaft and a sub-shaft are covered with a main shaft bellows and a sub-shaft bellows, respectively, to prevent the shafts from contacting the supplied gas.

A third object of the present invention is to provide a smooth vent valve in which a main shaft and a sub-shaft are covered with a diaphragm seal and a sub-shaft bellows, respectively, to prevent the shafts from contacting the supplied gas.

According to a first arrangement of the present invention, a smooth vent valve has an on-off valve and a flow control valve, which are coaxially provided between an inlet and outlet ports of a valve body. The on-off valve and the flow control valve are placed in series. An actuating mechanism for the on-off valve and an actuating mechanism for the flow control valve are formed separately from each other. When the on-off valve is in an open position, the flow control valve can be switched between a throttling position and an open position while continuously changing the flow rate.

According to a second arrangement of the present invention, the on-off valve in the first arrangement has an annular main valve seat and an annular main valve element, and the flow control valve has a sub-valve seat and a sub-valve element. The main valve seat and the sub-valve seat are formed integral with the valve body or provided as members separate from the valve body. The main valve element is connected to an annular main piston. A shaft of the sub-valve element extends through the main valve seat, main valve element and main piston of the on-off valve and is connected to a sub-piston.

According to a third arrangement of the present invention, the smooth vent valve according to the first and second arrangements has a main shaft bellows provided around the main valve element and the main shaft. One end of the main shaft bellows is connected to the inside of the valve body, and the other end of the main shaft bellows is connected to the main valve element. A sub-shaft bellows is provided around the shaft of the sub-valve element. One end of the sub-shaft bellows is connected to the lower end of the main valve element, and the other end of the sub-shaft bellows is connected to either the sub-valve element or the outer periphery of the shaft of the sub-valve element.

According to a fourth arrangement of the present invention, the smooth vent valve according to the first arrangement has a diaphragm seal. The inner peripheral edge of the diaphragm seal is secured to the main valve element of the on-off valve. The outer peripheral edge of the diaphragm seal is secured to the valve body. An annular main valve seat of the on-off valve is provided at a position opposite to the main valve element. One passage is formed outside the main valve seat, and another passage is formed inside the main valve element. When the main valve element is in contact with the main valve seat directly or through the diaphragm seal, communication between the two passages is cut off. When the main valve element or the diaphragm seal is separate from the main valve seat, the two passages are communicated with each other.

According to a fifth arrangement of the present invention, the on-off valve in the fourth arrangement has an annular main valve element. The flow control valve has a sub-valve element and an annular sub-valve seat. A V-shaped groove is formed in an end surface of the sub-valve element. The main valve element is connected to an annular main piston by a cylindrical main shaft. The sub-valve element has a sub-shaft that extends through the main valve seat, main valve element, main shaft and main piston of the on-off valve and is connected to a sub-piston.

According to a sixth arrangement of the present invention, the smooth vent valve according to the fifth arrangement has a hollow adjusting screw that is rotatably and axially immovably connected to a cover provided at an end of the valve body. An external thread portion of an adjusting member is engaged with an internal thread portion of the hollow adjusting screw. The adjusting member is connected to the sub-piston in such a manner as to be unable to rotate relative to the sub-piston and unable to come off it. A sub-spring is fitted between the sub-piston and the cover. When the flow control valve is in a throttling position, the axial position of the sub-valve element is adjustable with the adjusting member connected to the sub-piston.

According to a seventh arrangement of the present invention, the valve body in the fourth to sixth arrangements has a body and a bonnet. An O-ring seal and the outer peripheral edge of the diaphragm seal are clamped between an O-ring groove on the outer periphery at one end of the body and a slant abutment surface at an end of the bonnet that is opposite to the one end of the body. A sub-shaft bellows is provided around the shaft of the sub-valve element. One end of the sub-shaft bellows is connected to the other end of the main valve element, and the other end of the sub-shaft bellows is connected to the sub-valve element or the outer periphery of the shaft of the sub-valve element. The on-off valve is controlled by adjusting the pressure acting on the main piston. The flow control valve is controlled by adjusting the pressure acting on the sub-piston.

In the smooth vent valves according to the first and second arrangements, an on-off valve and a flow control valve are provided in series, and the on-off valve and the flow control valve can be operated by respective actuating mechanisms. Accordingly, the on-off operation of the on-off valve and the flow control of the flow control valve can be carried out accurately. If the flow control valve is switched over from a throttling position to an open position at a desired speed when the pressure is at a predetermined level, the initial supply of the supplied gas shifts to the main supply while the flow rate being continuously increased. Thus, the flow rate changes smoothly. Therefore, rising of dust can be satisfactorily suppressed even when the main supply is started. Furthermore, because there is only one position that needs a valve seal, i.e. the on-off valve, the generation of dust is minimized in comparison to an arrangement that needs a plurality of valve seals.

In the smooth vent valve according to the third arrangement, a main shaft bellows and a sub-shaft bellows are provided to cover the main shaft and the sub-shaft, respectively, to reduce the area of contact with the supplied gas. Accordingly, contamination of the inert gas is prevented, and the purity of the inert gas can be maintained.

In the smooth vent valves according to the fourth to seventh arrangements, a diaphragm seal and a sub-shaft bellows are provided to cover the main shaft and the sub-shaft, respectively, to reduce the area of contact with the supplied gas. Accordingly, contamination of the inert gas is prevented, and the purity of the inert gas can be maintained. The use of a diaphragm seal, which has a simple structure and can be used in a small space, contributes to the achievement of reductions in size and cost of smooth vent valves.

DETAILED DESCRIPTION OF THE PREFERRED EMBODIMENTS

Figure 1:
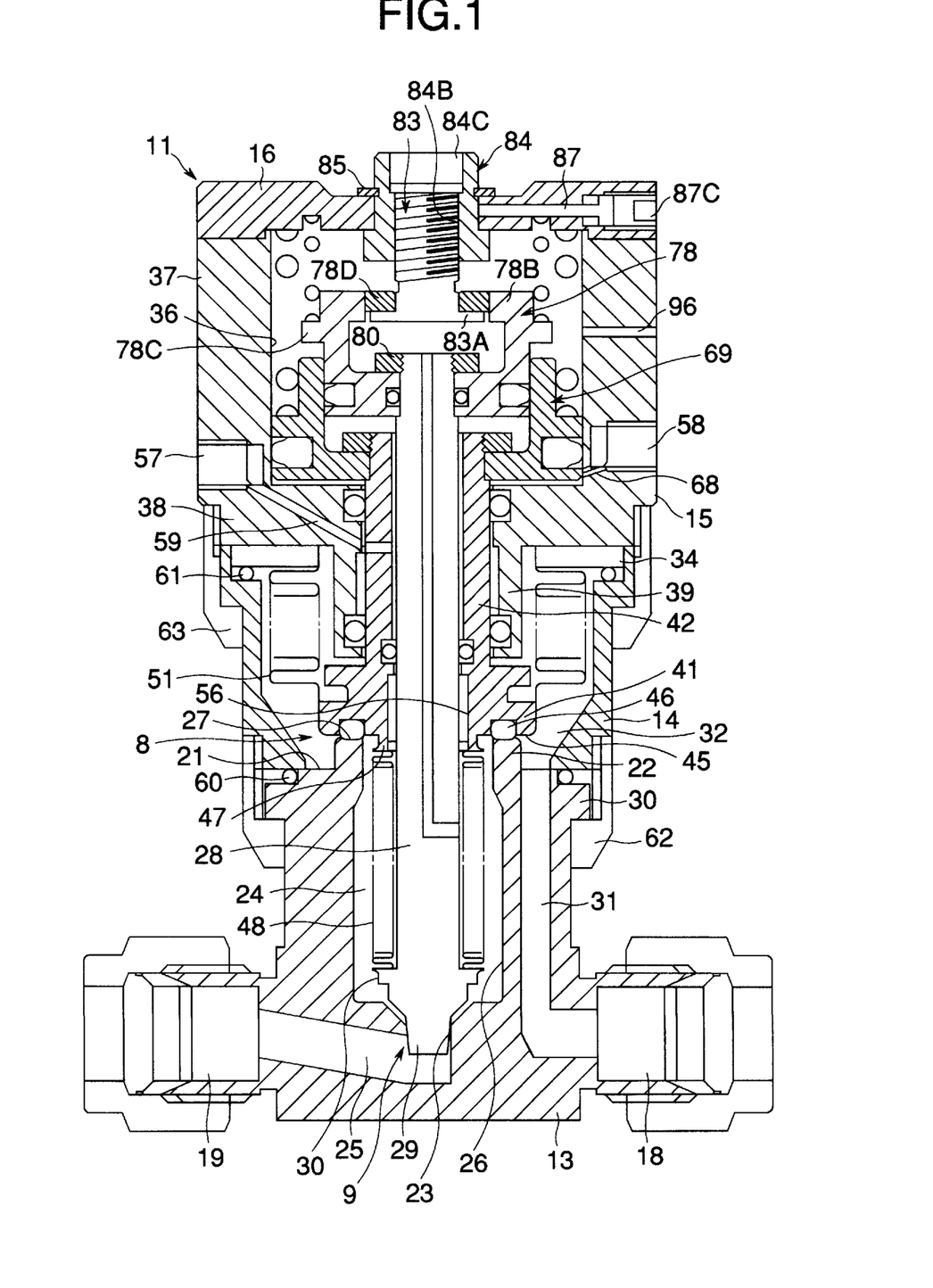
FIG. 1 is a vertical sectional view showing a first embodiment of the smooth vent valve according to the present invention.
Figure 2:
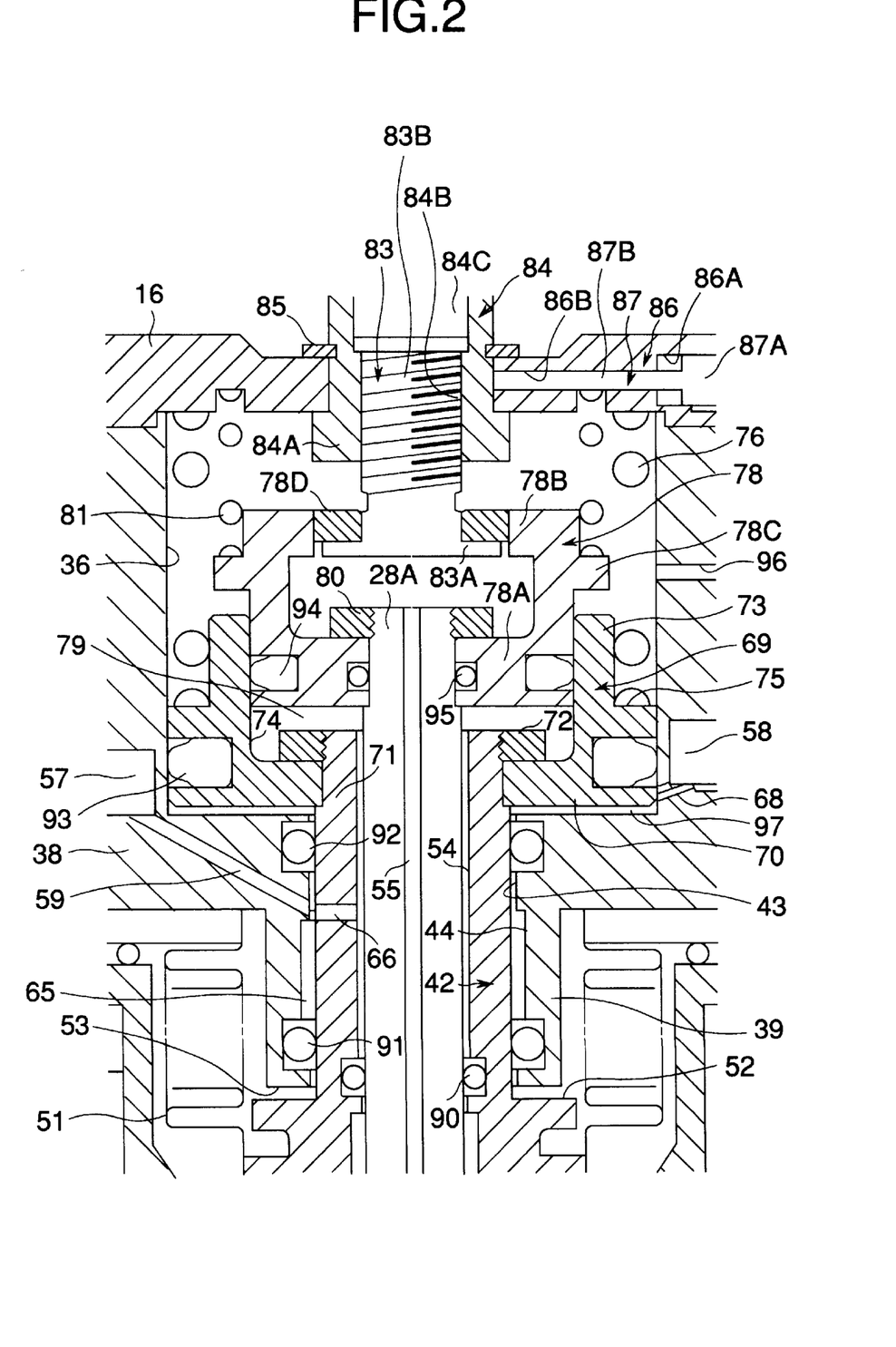
FIG. 2 is an enlarged view of an essential part of the embodiment shown in FIG. 1.

FIGS. 1 and 2 show a first embodiment of the smooth vent valve according to the present invention. A smooth vent valve 11 has an on-off valve 8 and a flow control valve 9, which are provided in series. The on-off valve 8 includes a main valve element 41, a main valve seat 27, etc. The flow control valve 9 includes a sub-valve element 29, a throttle seat (sub-valve seat) 23, etc. The on-off valve 8 is switched to an open position or a closed position by an actuating mechanism (including a main piston 69, a main cylinder portion 36, etc.). The flow control valve 9 is switched between a throttling position and an open position by an actuating mechanism (including a sub-piston 78, a sub-cylinder portion 74, etc.) while continuously changing the flow rate. Although in this embodiment a needle is illustrated as the sub-valve element 29, the sub-valve element 29 may be another type of valve element. The smooth vent valve 11 has a valve body that has, in order from the lower side as viewed in FIG. 1, a first body 13, an intermediate body 14, and a second body (bonnet) 15. A cover 16 is connected to the upper end of the second body 15. The lower end of the first body 13 is provided with a cylindrical inlet port 18 projecting rightward and a cylindrical outlet port 19 projecting leftward. The inlet port 18 and the outlet port 19 are formed integral with the first body 13. The inlet port 18 is communicated with a gas container. The outlet port 19 is communicated with a vacuum chamber.

The upper end of the first body 13 is provided with an annular horizontal portion 21. A step portion is formed around the outer periphery of the annular horizontal portion 21. A collar portion 30 is formed below the step portion. An annular projecting portion 22 is formed at the inner periphery of the annular horizontal portion 21. The upper end of the annular projecting portion 22 forms an annular main valve seat 27. An approximately cylindrical inner wall 26 extends downward inside the annular projecting portion 22. A cylindrical throttle seat 23 is formed at the lower end of the inner wall 26. The inside of the throttle seat 23 and the outlet port 19 are communicated by a second outlet passage 25. A needle shaft (shaft of the sub-valve element) 28 is inserted into the annular projecting portion 22. A sub-valve element (needle) 29 formed at the lower end of the needle shaft 28 is inserted into the throttle seat 23. The mutually opposing portions of the needle 29 and the throttle seat 23 are each a part of a cone. Accordingly, the flow rate can be controlled with high accuracy. A first inlet passage 31 is formed in the right-hand side of the inner wall 26 of the first body 13. The lower end of the first inlet passage 31 is communicated with the inlet port 18. The upper end of the first inlet passage 31 opens on the annular horizontal portion 21.

A seal ring 60 is fitted on a horizontal portion of the step portion of the first body 13. An annular lower end surface of the intermediate body 14 abuts on the annular horizontal portion 21 of the first body 13 and the seal ring 60. The first body 13 and the intermediate body 14 are connected together by a cylindrical connecting member 62. A flange portion of the connecting member 62 is in contact with the lower surface of the collar portion 30 of the first body 13. An internal thread portion of the connecting member 62 is engaged with an external thread portion of the intermediate body 14. In actual practice, the collar portion 30 is formed from two members obtained by splitting a ring into two. The two members are fitted into an annular groove of the first body 13. The connecting member 62 is engaged with the first body 13 before the two members are fitted. The intermediate body 14 has an approximately cylindrical shape. The intermediate body 14 has a large-diameter portion at the upper end thereof, which is contiguous with a step portion. A seal ring 61 is fitted on a horizontal portion of the step portion. An annular metal plate 34 abuts on the upper side of the seal ring 61. An annular connecting member 63 is loosely fitted to the outer side of the intermediate body 14 from the lower side. A flange portion of the connecting member 63 abuts on the lower surface of the step portion of the intermediate body 14. The outer peripheral surface of the lower end of the second body 15 abuts on the upper end surface of the intermediate body 14 and the upper surface of the annular metal plate 34. An internal thread portion of the connecting member 63 is engaged with an external thread portion at the lower end of the second body 15. Thus, the intermediate body 14 and the second body 15 are connected together by the connecting member 63.

The upper end portion of the second body 15 is a large-diameter cylindrical portion 37. A main cylinder portion 36 is formed in the cylindrical portion 37. The lower end portion of the second body 15 is a small-diameter cylindrical projecting portion 39. A partition 38 is formed between the cylindrical portion 37 and the cylindrical projecting portion 39. The cylindrical projecting portion 39 and the annular projecting portion 22 project into the intermediate body 14. An annular main valve element 41 is vertically movably provided between the lower end of the cylindrical projecting portion 39 and the main valve seat 27 at the upper end of the annular projecting portion 22. A cylindrical main shaft 42 is integrally connected to the upper end of the main valve element 41. The main shaft 42 extends through a large-diameter center bore 44 in the cylindrical projecting portion 39 and through a small-diameter center bore 43 in the partition 38. An annular groove is formed in an annular horizontal surface 45 at the lower end of the main valve element 41. A seal ring 46 is fitted in the annular groove. When the seal ring 46 contacts the main valve seat 27, the on-off valve 8 is closed. When the seal ring 46 separates from the main valve seat 27, the on-off valve 8 opens.

The main valve element 41 has an annular projection 47 projecting from the inner peripheral edge of the lower end thereof. A metallic needle bellows (sub-shaft bellows) 48 is provided around the needle shaft 28. The upper end (one end) of the needle bellows 48 is welded (connected) to the lower end surface of the annular projection 47. The lower end (other end) of the needle bellows 48 is welded to the upper end of a collar portion 30 at the lower end of the needle shaft 28. It should be noted that the lower end of the needle bellows 48 may be welded to the outer peripheral surface of either the needle shaft 28 or the sub-valve element 29. The needle bellows 48 closes the space between the lower end of the main valve element 41 and the lower end of the needle shaft 28 while allowing the main valve element 41 and the needle shaft 28 to move relative to each other. A first outlet passage 24 is formed between the needle bellows 48 and the cylindrical inner wall 26 of the first body 13.

A metallic main shaft bellows 51 is provided in the intermediate body 14 to surround the cylindrical projecting portion 39, the main valve element 41 and the main shaft 42. The upper end (one end) of the main shaft bellows 51 is welded to the lower end surface of the annular metal plate 34 and thus connected to the inside of the intermediate body 14. The lower end (other end) of the main shaft bellows 51 is welded to the outer peripheral surface of the main valve element 41. The main shaft bellows 51, the annular metal plate 34 and the seal ring 61 close the space between the outer peripheral surface of the main valve element 41 and the inner upper end portion of the intermediate body 14 while allowing the main valve element 41 and the intermediate body 14 to move relative to each other. The space formed between the inner surface of the intermediate body 14, the outer periphery of the main shaft bellows 51 and so forth is defined as a second inlet passage 32. The second inlet passage 32 is communicated with the first inlet passage 31. The communication between the second inlet passage 32 and the first outlet passage 24 is controlled by the on-off valve 8.

The main valve element 41 has an annular horizontal upper-end stop surface 52 at the top thereof. An annular horizontal lower-end stop surface 53 is provided at the lower end of the cylindrical projecting portion 39, which is above the upper-end stop surface 52. The upper-end stop surface 52 and the lower-end stop surface 53 constitute a stopper. The needle shaft 28 extends through a fitting bore 54 inside the hollow main shaft 42 and through a valve center bore 56 in the main valve element 41. An annular groove is formed on the lower end portion of the fitting bore 54. An O-ring 90 is fitted in the annular groove to hermetically seal the space between the outer peripheral surface of the needle shaft 28 and the inner peripheral surface of the fitting bore 54 of the main shaft 42. A relief bore 55 is formed in the center of the needle shaft 28. The upper end of the relief bore 55 opens on the upper end surface of the needle shaft 28. The lower end of the relief bore 55 opens on the side surface of a lower end portion of the needle shaft 28 inside the needle bellows 48. The space surrounded by the outer peripheral surface of the needle shaft 28, the O-ring 90, the fitting bore 54, the valve center bore 56 and the needle bellows 48 is communicated with the outside through the relief bore 55 and through the gap between the sub-piston 78 and an adjusting member 83 and further through the main cylinder portion 36 and a relief hole 96.

The cylindrical projecting portion 39 has an annular groove formed on the lower end portion of the large-diameter center bore 44. An O-ring 91 is fitted in the annular groove to hermetically seal the space between the inner peripheral surface of the lower end portion of the large-diameter center bore 44 and the outer peripheral surface of the main shaft 42. An annular groove is formed on the upper end portion of the small-diameter center bore 43 of the partition 38. An O-ring 92 is fitted in the annular groove to hermetically seal the space between the inner peripheral surface of the upper end portion of the small-diameter center bore 43 and the outer peripheral surface of the main shaft 42. An annular communicating chamber 65 is formed by the outer peripheral surface of the main shaft 42, the inner peripheral surfaces of the small- and large-diameter center bores 43 and 44 and the O-rings 91 and 92. A sub-port 57 is formed in the left-hand side of the lower end portion of the cylindrical portion 37 of the second body 15. One end of a communicating passage 59 formed in the partition 38 is communicated with the sub-port 57. The other end of the communicating passage 59 opens into the lower end of the small-diameter center bore 43. Thus, the communicating passage 59 is communicated with the annular communicating chamber 65.

A main port 58 is formed in the right-hand side of the lower end portion of the cylindrical portion 37. The main port 58 is communicated with a main cylinder chamber 97 (surrounded by the lower surface of the main piston 69 and the main cylinder portion 36) in the main cylinder portion 36 by a small-diameter communicating passage 68. The main piston 69 is slidably fitted in the main cylinder portion 36. A seal member 93 is fitted in an annular groove formed in the outer peripheral surface of the main piston 69. The seal member 93 hermetically seals the space between the outer peripheral surface of the main piston 69 and the main cylinder portion 36. The main shaft 42 has a small-diameter portion 71 at the upper end thereof, which is contiguous with a step. The main piston 69 has a central partition 70 at the bottom thereof. The central partition 70 has a center bore. The small-diameter portion 71 of the main shaft 42 extends through the center bore of the central partition 70. An external thread portion at the upper end of the small-diameter portion 71 projects upward from the central partition 70. A nut 72 is engaged with the external thread portion of the small-diameter portion 71. Thus, the main shaft 42 and the main piston 69 are connected together.

The main piston 69 has a cylindrical portion 73 at the upper end thereof. A sub-cylinder portion 74 is formed in the cylindrical portion 73. The sub-cylinder portion 74 extends over the upper surface of the central partition 70. An annular retaining portion 75 is formed on the outer periphery of the cylindrical portion 73 at the upper end of the main piston 69. A seal spring 76 is fitted between the annular retaining portion 75 and the lower surface of the cover 16. Resilient force from the seal spring 76 urges the main piston 69, the main shaft 42, the main valve element 41 and the seal ring 46 downward to press the seal ring 46 on the main valve seat 27. A hollow sub-piston 78 is slidably fitted in the sub-cylinder portion 74. A seal member 94 is fitted in an annular groove formed on the outer peripheral surface of the sub-piston 78. The seal member 94 hermetically seals the space between the outer peripheral surface of the sub-piston 78 and the sub-cylinder portion 74. The space surrounded by the sub-cylinder portion 74 and the sub-piston 78 is defined as a sub-cylinder chamber 79. The sub-cylinder chamber 79 is communicated with the annular communicating chamber 65 through the annular communicating passage formed in the fitting bore 54 between the main shaft 42 and the needle shaft 28 and through a communicating bore 66 formed in the main shaft 42. The sub-cylinder chamber 79 is further communicated with the sub-port 57 through the communicating passage 59.

The needle shaft 28 has a small-diameter portion 28A at the upper end thereof, which is contiguous with a step. The sub-piston 78 has a lower partition 78A at the bottom thereof. The lower partition 78A has a center bore. The small-diameter portion 28A of the needle shaft 28 extends through the center bore of the lower partition 78A. An external thread portion at the upper end of the small-diameter portion 28A projects upward from the lower partition 78A. A nut 80 is engaged with the external thread portion of the small-diameter portion 28A. Thus, the needle shaft 28 and the sub-piston 78 are connected together. An annular groove is formed in the wall of the center bore in the lower partition 78A. An O-ring 95 is fitted in the annular groove to hermetically seal the space between the wall of the center bore in the lower partition 78A and the needle shaft 28. The sub-piston 78 has a collar portion 78C at a position somewhat closer to the upper end thereof. A sub-spring 81 is fitted between the collar portion 78C and the lower surface of the cover 16. The sub-spring 81 urges the sub-piston 78 downward.

The sub-piston 78 has an upper partition 78B at the top thereof. The upper partition 78B has an internal thread portion. An annular member 78D is fitted to internal thread portion of the upper partition 78B. The annular member 78D has a center hole. A lower end shaft portion of an adjusting member 83 with a flange 83A is fitted into the center hole of the annular member 78D. Thus, the sub-piston 78 and the adjusting member 83 are connected together in such a way that they are unable to rotate relative to each other and the sub-piston 78 is unable to come off the adjusting member 83. It should be noted that after the nut 80 and the flange 83A have been inserted, the annular member 78D is engaged with the upper partition 78B, and a member (not shown) is fitted to prevent rotation of the annular member 78D. A hollow adjusting screw 84 with a flange 84A is rotatably inserted into a center bore of the cover 16 from the lower side. A retaining member 85 is fitted in an annular groove on the outer periphery of the hollow adjusting screw 84. Thus, the hollow adjusting screw 84 is connected in such a way that it is axially immovable. The hollow adjusting screw 84 has a center bore. An internal thread portion 84B is formed on the wall of the lower end portion of the center bore. A fitting hole 84C for a turning tool is formed at the upper end portion of the center bore. An external thread portion 83B at the upper end of the adjusting member 83 is engaged with the internal thread portion 84B.

The cover 16 is provided with a stepped horizontal bore 86 extending from a side of the cover 16 through the center bore. The horizontal bore 86 has a large-diameter portion 86A extending from the side of the cover 16 to a predetermined distance. The large-diameter portion 86A has an internal thread. The rest of the horizontal bore 86 is a small-diameter portion 86B. A stepped stopper 87 is fitted into the horizontal bore 86. A small-diameter portion 87B of the stopper 87 is inserted into the small-diameter portion 86B of the horizontal bore 86. A large-diameter portion 87A of the stopper 87 has an external thread. The external thread is engaged with the internal thread of the large-diameter portion 86A of the horizontal bore 86. A fitting hole 87C is formed in the proximal end surface of the stopper 87. With a turning tool fitted in the fitting hole 87C, the stopper 87 is rotated to press the distal end of the small-diameter portion 87B thereof against the outer peripheral surface of the hollow adjusting screw 84, thereby preventing rotation of the hollow adjusting screw 84.

Next, the operation of the first embodiment of the present invention will be described. Let us assume that when the smooth vent valve is in the illustrated position, the on-off valve 8 is in a closed position, and the flow control valve 9 is in a throttling position. In addition, a gas container (not shown) is communicated with the inlet port 18, and the outlet port 19 is communicated with a vacuum chamber (not shown). An inert gas from the gas container passes through the inlet port 18 and the first inlet passage 31 and flows into the second inlet passage 32. The inert gas cannot move any further because the on-off valve 8 is in the closed position. It should be noted that because of the presence of the main shaft bellows 51 and the needle bellows (sub-shaft bellows) 48, the inert gas contacts only the inner surfaces of the first and intermediate bodies 13 and 14 and the metal surfaces of the main valve element 41, the seal ring 46, the sub-valve element 29, etc. or surfaces relating to seal rings for fixing, but does not contact other portions that need a lubricant, e.g. grease, such as O-rings for sliding. Therefore, there is a reduction in the area of contact with O-rings, which may constitute a contamination source. Accordingly, contamination of the inert gas is prevented, and the purity of the inert gas can be maintained.

When compressed air is supplied to the main port 58, it passes through the small-diameter communicating passage 68 and flows into the main cylinder chamber 97, causing the main piston 69 and the main shaft 42, together with the main valve element, 41, to move upward. When the upper-end stop surface 52 of the main valve element 41 comes into contact with the lower-end stop surface 53 of the cylindrical projecting portion 39, the movement of the main piston 69 and so forth stops. At this time, the seal ring 46 of the main valve element 41 is separate from the main valve seat 27 by a predetermined distance. Thus, the on-off valve 8 is switched to an open position.

The inert gas flowing into the second inlet passage 32 passes between the main valve seat 27 and the seal ring 46 of the on-off valve 8 and through the first outlet passage 24. After the flow rate has been controlled by the sub-valve element 29 and the throttle seat 23 of the flow control valve 9, the inert gas passes through the second outlet passage 25 and the outlet port 19 and is sucked into the vacuum chamber. To control the flow rate through the flow control valve 9, the stopper 87 is untightened with a tool fitted in the fitting hole 87C of the stopper 87. Then, the hollow adjusting screw 84 is rotated. Rotation of the hollow adjusting screw 84 causes the adjusting member 83, the sub-piston 78, the needle shaft 28 and the sub-valve element (needle) 29 to move slightly in the vertical direction. Thus, the gap between the sub-valve element 29 and the throttle seat 23 is adjusted. The initial gas supply is carried out with the flow control valve 9 set in the throttling position. The inert gas is supplied at a lowered flow rate through the flow control valve 9 so as not to raise dust.

When the pressure in the vacuum chamber has reached a predetermined pressure (i.e. a pressure at which there is no likelihood of dust being whirled up even if the inert gas is supplied at a high flow rate) that is somewhat close to the atmospheric pressure, compressed air is supplied to the sub-port 57. Consequently, the compressed air passes through the communicating passage 59, the annular communicating chamber 65, the communicating bore 66 and the annular communicating passage and flows into the sub-cylinder chamber 79, causing the sub-piston 78, needle shaft 28 and the sub-valve element 29 to move upward. When the upper surface of the upper partition 78B of the sub-piston 78 comes into contact with the lower end surface of the flange 84A of the hollow adjusting screw 84, the movement of the sub-piston 78 and so forth stops. At this time, the sub-valve element 29 is separate from the throttle seat 23 by a predetermined distance. The flow control valve 9 is switched from the throttling position to the open position in a desired period of time. Thus, the flow control valve 9 can be switched from the throttling position to the open position while continuously increasing the flow rate. The flow rate can be changed smoothly from the initial supply to the main supply. Because the pressure in the vacuum chamber has already reached the predetermined pressure, rising of dust can be satisfactorily suppressed even when the inert gas flows toward the vacuum chamber at a high flow rate. Accordingly, the pressure in the vacuum chamber can be raised to the atmospheric pressure within a short period of time without raising dust.

FIGS. 3 to 5b show a second embodiment of the smooth vent valve according to the present invention. A smooth vent valve 111 has an on-off valve 108 and a flow control valve (poppet valve) 109, which are provided in series. The on-off valve 108 consists essentially of a main valve element 141 and a main valve seat 127 provided at a position opposite to the main valve element 141. The flow control valve 109 consists essentially of a sub-valve element 129 and a sub-valve seat 123. The on-off valve 108 is switched to an open position or a closed position by an actuating mechanism (including a main piston 169, a main cylinder portion 136, etc.). The flow control valve 109 is switched between a throttling position (i.e. a lowest flow rate position) and an open position by an actuating mechanism (including a sub-piston 178, a sub-cylinder portion 174, etc.) while continuously changing the flow rate. Although in this embodiment a poppet type flow control valve is shown as the sub-valve element 129, the sub-valve element 129 may be another type of valve element. The smooth vent valve 111 has a valve body that has an approximately square outer shape in a plan view. The smooth vent valve 111 has a body 113, a bonnet 115 and a cover 116, which are placed in order from the lower side as viewed in FIG. 3. The lower end of the body 113 is provided with a cylindrical inlet port 118 projecting rightward and a cylindrical outlet port 119 projecting leftward. The inlet port 118 and the outlet port 119 are formed integral with the body 113. The inlet port 118 is communicated with a gas container. The outlet port 119 is communicated with a vacuum chamber.

Figure 3:
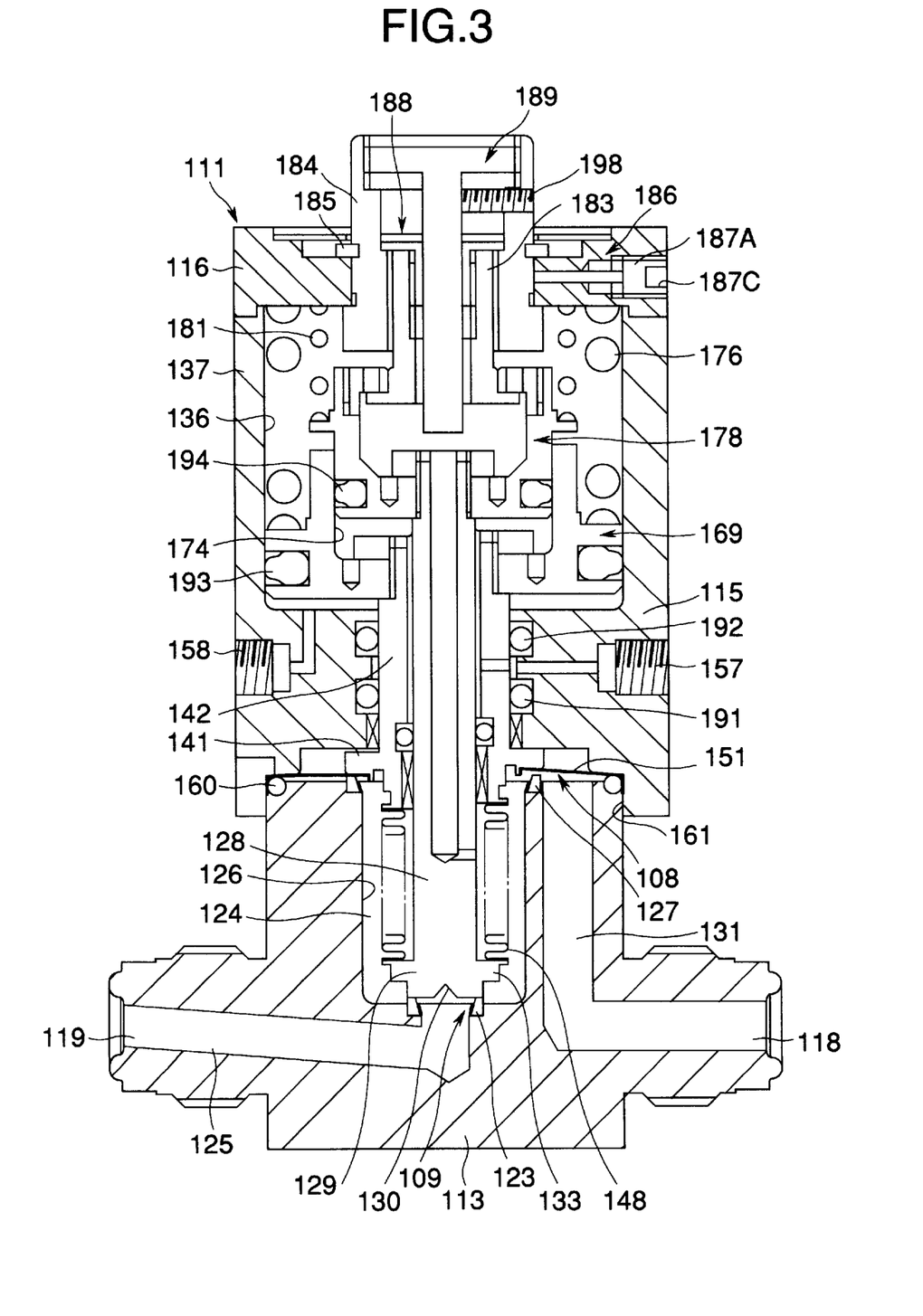
FIG. 3 is a vertical sectional view showing a second embodiment of the smooth vent valve according to the present invention.
Figure 5A:
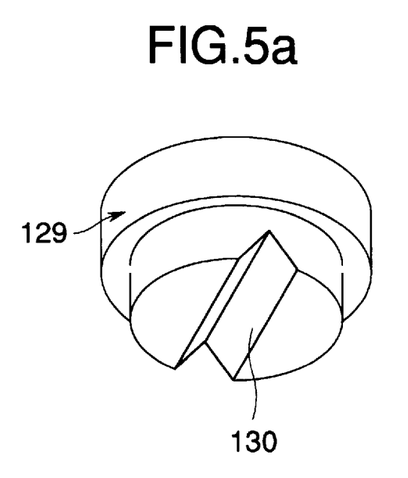
FIG. 5a is an enlarged perspective view of a sub-valve element.
Figure 5B:
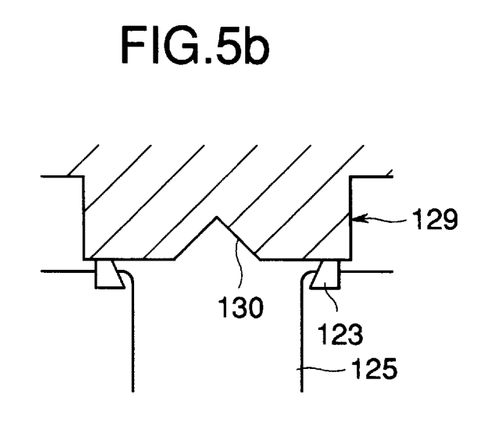
FIG. 5b is an enlarged sectional view of the sub-valve element.

The body 113 has an approximately square outer shape in a top plan view. The body 113 has a horizontal portion 121 at the upper end thereof. An annular groove is formed near the inner peripheral edge of the horizontal portion 121. An annular main valve seat 127 is fitted in the annular groove. An approximately cylindrical inner wall 126 (first outlet passage 124) extends downward inside the main valve seat 127. An annular groove is formed in the bottom wall at the lower end of the inner wall 126. A sub-valve seat 123 is fitted in the annular groove. The space inside the sub-valve seat 123 and the outlet port 119 are communicated by a second outlet passage 125. A sub-shaft 128, which is integral with a sub-valve element 129, is inserted into the space inside the inner wall 126. The sub-valve element 129 at the lower end of the sub-shaft 128 moves vertically relative to the sub-valve seat 123, thereby adjusting the gap between the lower end of the sub-valve element 129 and the sub-valve seat 123. As shown in FIGS. 3, 5a and 5b, the sub-valve element 129 has a disk-shaped lower end that has a V-shaped groove 130 on a diametrical line passing through the center of the lower surface (end surface) of the sub-valve element 129.

When the lower end of the sub-valve element 129 abuts on the sub-valve seat 123, a gap is formed between the sub-valve seat 123 and each end of the V-shaped groove 130 of the sub-valve element 129. A fluid flows through the gap at the lowest flow rate. The diameter of the lower end of the sub-valve element 129 is set somewhat larger than the diameter of the sub-valve seat 123. Accordingly, even if the sub-valve element 129 and the sub-valve seat 123 are decentered with respect to each other, the flow control valve 109 can normally perform its function. A first inlet passage 131 is formed in the right-hand side of the inner wall 126 of the body 113 at a position outside the main valve seat 127. The lower end of the first inlet passage 131 is communicated with the inlet port 118. The upper end of the first inlet passage 131 opens on the horizontal portion 121 and is communicated with a second inlet passage 132.

An O-ring groove 122 having an arcuate sectional-configuration is formed along the outer peripheral edge of the horizontal portion 121 at the upper end of the body 113. An O-ring seal 160 is fitted in the O-ring groove 122. The bonnet 115 has an approximately square shape in a top plan view. The bonnet 115 has a cylindrical portion 137 at the upper end thereof. A main cylinder portion 136 is formed in the cylindrical portion 137. The bonnet 115 has a center bore 144 extending through the lower end portion thereof. The lower end portion of the bonnet 115 is provided with a large-diameter hole 161, a slant abutment surface 162 and a medium-diameter hole 163. The large-diameter hole 161 is formed so as to fit to the outer periphery of the upper end portion of the body 113. The bonnet 115 has a projection at the inner periphery of the upper end of the cylindrical portion 137. The projection enables the upper end of the bonnet 115 and the lower end of the outer peripheral portion of the cover 116 to snugly fit to each other. The outer shape of the cover 116 is also approximately square in a top plan view. The cover 116 and the bonnet 115 each have insertion bores (not shown) extending vertically through four corners thereof. Bolt bores are formed in the upper end portion of the body 113 at respective positions facing opposite to the corresponding insertion bores.

The lower end of the bonnet 115 has an annular horizontal stop surface 153 between the medium-diameter hole 163 and the center bore 144. An annular main valve element 141 is vertically movably provided between the stop surface 153 and the main valve seat 127 at the upper end of the body 113. A cylindrical main shaft 142 is integrally connected to the upper end of the main valve element 141. The main shaft 142 extends through the center bore 144. The main valve element 141 has an annular horizontal surface 145 at the lower end thereof. The inner peripheral edge of a metallic diaphragm seal 151 is welded to the annular horizontal surface 145 by electron beam welding. When the inner peripheral edge of the diaphragm seal 151 comes into contact with the main valve seat 127, the on-off valve 108 is closed. When the diaphragm seal 151 separates from the main valve seat 127, the on-off valve 108 opens. The arrangement may be such that the inner peripheral edge of the diaphragm seal 151 is welded to the outer peripheral surface of the main valve element 141, and the main valve element 141 and the main valve seat 127 are brought into direct contact with each other, thereby opening and closing the on-off valve 108.

The outer peripheral portion of the diaphragm seal 151 is placed over the upper and outer peripheral surfaces of the O-ring seal 160, and the slant abutment surface 162 of the bonnet 115 is placed to abut on the diaphragm seal 151 from the upper side. Then, hexagon socket head bolts (not shown) are inserted into the insertion bores in the corners of the cover 116 and the bonnet 115 and engaged with the bolt bores of the body 113, thereby connecting together the body 113, the bonnet 115 and the cover 116. Consequently, the outer peripheral portion of the diaphragm seal 151, together with the O-ring seal 160, is clamped and sealed by the O-ring groove 122 of the body 113 and the slant abutment surface 162 of the bonnet 115. The diaphragm seal 151 closes the space between the outer peripheral and lower surfaces of the main valve element 141 on the one hand and the body 113 and the O-ring seal 160 on the other while allowing the main valve element 141 to move relative to the body 113 and the O-ring seal 160.

The main valve element 141 has an annular projection 147 projecting downward from the inner periphery of the lower end thereof. A metallic sub-shaft bellows 148 is provided around the lower end portion of the sub-shaft 128. The upper end (one end) of the sub-shaft bellows 148 is welded (connected) to the lower end surface of the annular projection 147. The lower end (other end) of the sub-shaft bellows 148 is welded to the upper surface of a collar portion 133 provided at the lower end of the sub-shaft 128. It should be noted that the lower end of the sub-shaft bellows 148 may be welded to the outer peripheral surface of the sub-shaft 128 or the sub-valve element 129. The sub-shaft bellows 148 closes the space between the lower end of the main valve element 141 and the lower end of the sub-shaft 128 while allowing the main valve element 141 and the sub-shaft 128 to move relative to each other. The space between the sub-shaft bellows 148 and the inner wall 126 of the body 113 is defined as a first outlet passage 124. The space between the lower surface of the diaphragm seal 151, the horizontal portion 121 and the main valve element 141 is defined as a second inlet passage 132. The second inlet passage 132 is communicated with the first inlet passage 131. The communication between the second inlet passage 132 and the first outlet passage 124 is controlled by the on-off valve 108.

The main valve element 141 has an annular horizontal stop surface 152 at the upper end thereof. The stop surface 152 faces opposite to the stop surface 153. The stop surfaces 152 and 153 constitute a stopper for the upper position of the main valve element 141. A rotatably supporting bush 150 is fitted in a valve center bore 156 of the main valve element 141. The sub-shaft 128 extends through a fitting bore 154 in the main shaft 142 and through the bush 150. An annular groove is formed on the lower end portion of the fitting bore 154. An O-ring 190 is fitted in the annular groove to hermetically seal the space between the outer periphery of the sub-shaft 128 and the inner periphery of the fitting bore 154 of the main shaft 142. A relief bore 155 is formed in the center of the sub-shaft 128. The upper end of the relief bore 155 opens on the upper end surface of the sub-shaft 128. The lower end of the relief bore 155 opens on the side surface of the lower end portion of the sub-shaft 128 inside the sub-shaft bellows 148. The space surrounded by the outer peripheral surface of the sub-shaft 128, the O-ring 190, the valve center bore 156 and the sub-shaft bellows 148 is communicated with the outside through the relief bore 155, the gap between a sub-piston 178 and an adjusting member 183, the main cylinder portion 136 and the gap between a hollow adjusting screw 184 on the one hand and the adjusting member 183, an end stopper 188 and a setscrew 189 on the other.

The center bore 144 has a large-diameter portion at the lower end thereof. A rotatably supporting bush 149 is fitted in the large-diameter portion. The center bore 144 has annular grooves in its upper end and intermediate portions, respectively. O-rings 192 and 191 are fitted in these annular grooves, respectively. The space between the inner peripheral surfaces of the upper end and intermediate portions of the center bore 144 and the outer peripheral surface of the main shaft 142 is hermetically sealed. An annular communicating chamber 165 is formed by the outer peripheral surface of the main shaft 142 and the inner peripheral surface of the center bore 144, together with the O-rings 191 and 192. A sub-port 157 is formed in the right-hand side of the lower end portion of the bonnet 115. The sub-port 157 is communicated with the annular communicating chamber 165 by a communicating passage 159. A main port 158 is formed in the left-hand side of the lower end portion of the bonnet 115. The main port 158 is communicated with a main cylinder chamber 197 in the main cylinder portion 136 (which is surrounded by the main piston 169 and the main cylinder portion 136) by a communicating passage 168.

A main piston 169 is slidably fitted in the main cylinder portion 136. A seal member 193 is fitted in an annular groove formed on the outer peripheral surface of the main piston 169. The seal member 193 hermetically seals the space between the outer peripheral surface of the main piston 169 and the main cylinder portion 136. The main shaft 142 has a small-diameter portion 171 at the upper end thereof, which is contiguous with a step. The main piston 169 has a central partition 170 at the bottom thereof. The central partition 170 has a center bore. The small-diameter portion 171 of the main shaft 142 extends through the center bore of the central partition 170. An external thread portion at the upper end of the small-diameter portion 171 projects upward from the central partition 170. A nut 172 is engaged with the external thread portion of the small-diameter portion 171. Thus, the main shaft 142 and the main piston 169 are connected together.

The main piston 169 has a cylindrical portion 173 at the upper end thereof. A sub-cylinder portion 174 is formed in the cylindrical portion 173. The sub-cylinder portion 174 extends over the upper surface of the central partition 170. An annular retaining portion 175 is formed on the outer periphery of the cylindrical portion 173 at the upper end of the main piston 169. A seal spring 176 is fitted between the annular retaining portion 175 and the lower surface of the cover 116. Resilient force from the seal spring 176 urges the main piston 169, the main shaft 142, the main valve element 141 and the diaphragm seal 151 downward to press the inner peripheral edge of the diaphragm seal 151 on the main valve seat 127. A hollow sub-piston 178 is slidably fitted in the sub-cylinder portion 174. A seal member 194 is fitted in an annular groove formed on the outer peripheral surface of the sub-piston 178. The seal member 194 hermetically seals the space between the outer peripheral surface of the sub-piston 178 and the sub-cylinder portion 174. The space surrounded by the sub-cylinder portion 174 and the sub-piston 178 is defined as a sub-cylinder chamber 179. The sub-cylinder chamber 179 is communicated with the annular communicating chamber 165 through the annular communicating passage formed in the fitting bore 154 between the main shaft 142 and the sub-shaft 128 and through a communicating bore 166 formed in the main shaft 142. The sub-cylinder chamber 179 is further communicated with the sub-port 157 through the communicating passage 159.

The sub-shaft 128 has a small-diameter portion 128A at the upper end thereof, which is contiguous with a step. The sub-piston 178 has a partition 178A at the bottom thereof. The partition 178A has a center bore. The small-diameter portion 128A of the sub-shaft 128 extends through the center bore of the partition 178A. An external thread portion at the upper end of the small-diameter portion 128A projects upward from the partition 178A. A nut 180 is engaged with the external thread portion of the small-diameter portion 128A. Thus, the sub-shaft 128 and the sub-piston 178 are connected together. The sub-piston 178 has a collar portion 178C at a position somewhat closer to the upper end thereof. A sub-spring 181 is fitted between the upper surface of the collar portion 178C and the lower surface of the cover 116. The sub-spring 181 urges the sub-piston 178, the sub-shaft 128, etc. downward.

The sub-piston 178 has a cylindrical portion 178D at the upper end thereof. The cylindrical portion 178D has an internal thread on the inner surface thereof. An external thread on the outer peripheral surface of an annular member 177 is engaged with the internal thread of the cylindrical portion 178D. The annular member 177 has a plurality of communicating bores 177A. The annular member 177 further has splines formed on the inner peripheral surface thereof. An adjusting member 183 with a flange 183A has a spline portion at the lower end thereof. The spline portion is engaged with the inner peripheral surface of the annular member 177. The sub-piston 178 and the adjusting member 183 are connected together in such a way that they are unable to rotate relative to each other and unable to come off. It should be noted that after the nut 180 and the flange 183A have been inserted, the annular member 177 is engaged, and a member (not shown) is fitted to prevent rotation of the cylindrical portion 178D. A hollow adjusting screw 184 with a flange 184A is rotatably inserted into a center bore of the cover 116 from the lower side. A retaining member 185 is fitted in an annular groove on the outer periphery of the hollow adjusting screw 184. The lower surface of the outer peripheral portion of the retaining member 185 abuts on the upper surface of the cover 116. Thus, the hollow adjusting screw 184 is connected by the retaining member 185 and the flange 184A in such a way that it is axially immovable.

The hollow adjusting screw 184 has an upper internal thread portion 184B, a fitting bore 184C and a lower internal thread portion 184D, which are formed on the inner surface thereof in order from the upper side. An external thread portion 183B at the upper end of the adjusting member 183 is engaged with the lower internal thread portion 184D. The adjusting member 183 has an internal thread portion 183C at the upper end of the inner surface thereof. The adjusting member 183 has an insertion bore 183D at the lower end thereof. An external thread portion 188A of the end stopper 188 is engaged with the internal thread portion 183C. A flange portion 188B of the end stopper 188 is fitted into the fitting bore 184C to abut on the upper end surface of the adjusting member 183. The flange portion 188B is engaged with a step portion between the fitting bore 184C and the lower internal thread portion 184D.

The cover 116 is provided with a stepped horizontal bore 186 extending from a side of the cover 116 to the center bore. The horizontal bore 186 has a large-diameter portion 186A extending from the side of the cover 116 through a predetermined distance. The large-diameter portion 186A has an internal thread. The rest of the horizontal bore 186 is a small-diameter portion 186B. A stepped stopper 187 is fitted into the horizontal bore 186. A small-diameter portion 187B of the stopper 187 is inserted into the small-diameter portion 186B of the horizontal bore 186. A large-diameter portion 187A of the stopper 187 has an external thread. The external thread is engaged with the internal thread of the large-diameter portion 186A of the horizontal bore 186. A fitting hole 187C is formed in the proximal end surface of the stopper 187. With a turning tool fitted in the fitting hole 187C, the stopper 187 is rotated to press the distal end of the small-diameter portion 187B thereof against the outer peripheral surface of the hollow adjusting screw 184, thereby preventing rotation of the hollow adjusting screw 184. An external thread portion of a small stopper 198 is engaged with a horizontal threaded bore 184E of the hollow adjusting screw 184. Rotating the small stopper 198 causes the distal end thereof to come into contact with a shaft portion 189A of the setscrew 189 to prevent rotation of the setscrew 189. The upper extremity position of the sub-piston 178 is regulated by the distal end of the shaft portion 189A of the setscrew 189. The lower extremity position of the sub-piston 178 is regulated by the flange 183A of the adjusting member 183.

Figure 4:
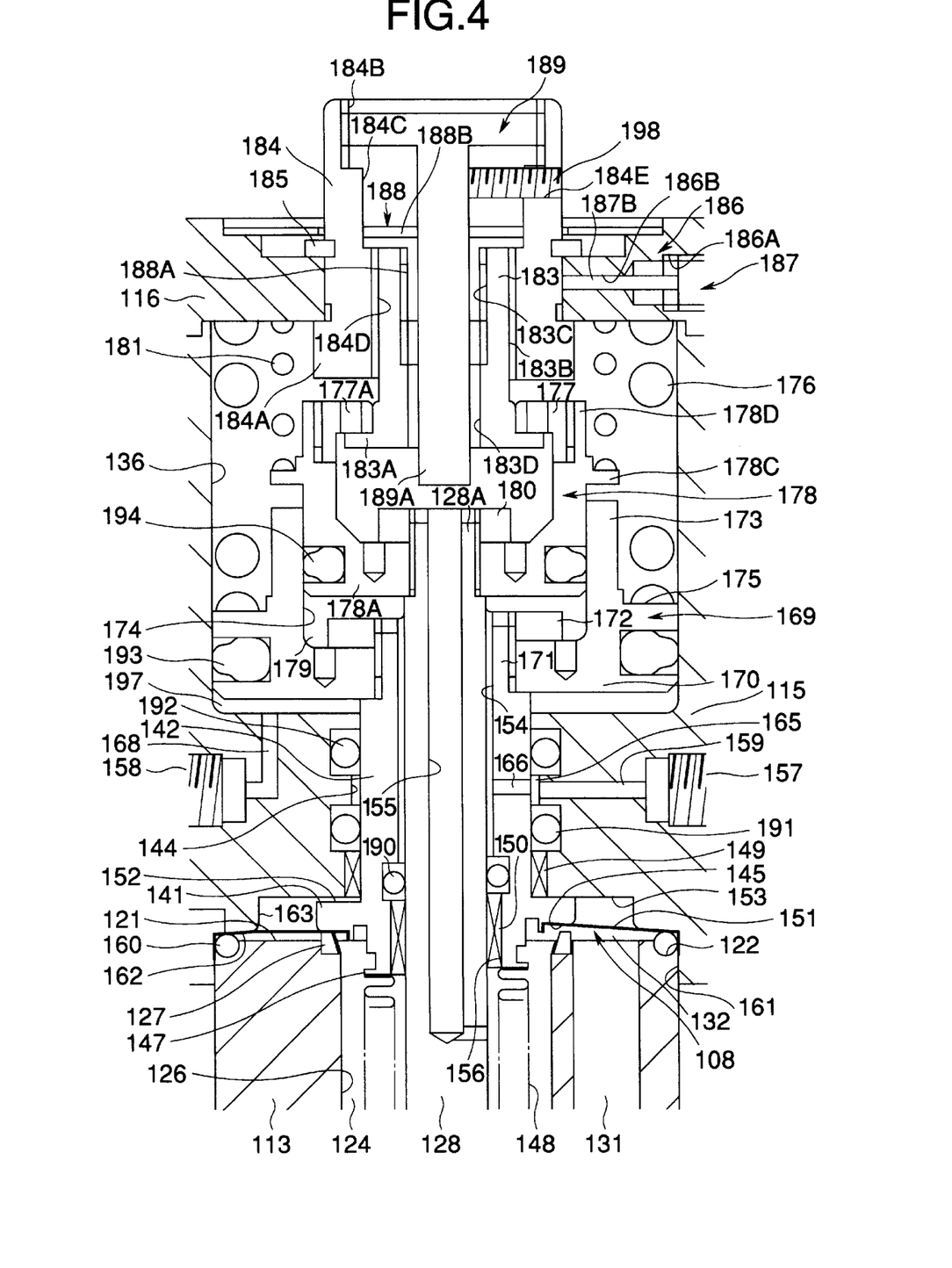
FIG. 4 is an enlarged view of an essential part of the embodiment shown in FIG. 3.

Next, the operation of this embodiment of the present invention will be described. In FIGS. 3 and 4, the left-hand half of the on-off valve 108 is in the closed position, and the right-hand half of it is in the open position. Let us assume that the flow control valve 109 is in the lowest flow rate position (throttling position), in which the lower end surface of the sub-valve element 129 abuts on the sub-valve seat 123, and that a gas container (not shown) is communicated with the inlet port 118, and a vacuum chamber (not shown) is communicated with the outlet port 119. An inert gas from the gas container passes through the inlet port 118 and the first inlet passage 131 and flows into the second inlet passage 132. However, when the on-off valve 108 is in the closed position, the inert gas cannot move any further. It should be noted that because of the presence of the diaphragm seal 151 and the sub-shaft bellows 148, the inert gas contacts only the inner surface of the body 13 and the metal surfaces of the main valve element 141, the sub-valve element 129, the diaphragm seal 151, the sub-shaft bellows 148, etc. or surfaces relating to the O-ring seal 160 for fixing, the main valve seat 127 and the sub-valve seat 123, but does not contact other portions that need a lubricant, e.g. grease, such as O-rings for sliding. Therefore, there is no area of contact with O-rings, which may constitute a contamination source. Accordingly, contamination of the inert gas is prevented, and the purity of the inert gas can be maintained.

When compressed air is supplied to the main port 158, it passes through the communicating passage 168 and flows into the main cylinder chamber 197, causing the main piston 169, the main shaft 142, the main valve element 141 and the greater part of the diaphragm seal 151 to move upward against the urging force from the seal spring 176. When the stop surface 152 of the main valve element 141 comes into contact with the stop surface 153 of the bonnet 115, the movement of the main piston 169 and so forth stops. At this time, the main valve element 141 and the diaphragm seal 151 are separate from the valve seat 127 by a predetermined distance. Thus, the on-off valve 108 is placed in an open position.

The inert gas flowing into the second inlet passage 132 passes between the main valve seat 127 and the diaphragm seal 151 of the on-off valve 108 and through the first outlet passage 124. After the flow rate has been controlled by the sub-valve element 129 and the sub-valve seat 123 of the flow control valve 109, the inert gas passes through the second outlet passage 125 and the outlet port 119 and is supplied to the vacuum chamber. To control the flow rate through the flow control valve 109, the stopper 187 is untightened with a tool fitted in the fitting hole 187C of the stopper 187. Then, the hollow adjusting screw 184 is rotated. Because the sub-piston 178 is urged downward by the sub-spring 181 and the flange 183A of the adjusting member 183 and the annular member 177 are engaged with each other, the rotation of the hollow adjusting screw 184 causes the adjusting member 183, the sub-piston 178, the sub-shaft 128 and the sub-valve element 129 to move slightly in the vertical direction. Thus, the gap between the sub-valve element 129 and the sub-valve seat 123 is adjusted. The initial gas supply is carried out with the flow control valve 109 set in the throttling position (lowest flow rate position). The inert gas is supplied at a lowered flow rate through the flow control valve 109 so as not to raise dust.

When the pressure in the vacuum chamber has reached a predetermined pressure (i.e. a pressure at which there is no likelihood of dust being whirled up even if the inert gas is supplied at a high flow rate) that is somewhat close to the atmospheric pressure, compressed air is supplied to the sub-port 157. Consequently, the compressed air passes through the communicating passage 159, the annular communicating chamber 165, the communicating bore 166 and the annular communicating passage and flows into the sub-cylinder chamber 179, causing the sub-piston 178, sub-shaft 128 and the sub-valve element 129 to move upward. When the upper surface of the sub-shaft 128 comes into contact with the lower end surface of the shaft portion 189A of the setscrew 189, the movement of the sub-piston 178 and so forth stops. At this time, the sub-valve element 129 is separate from the sub-valve seat 123 by a predetermined distance. The flow control valve 109 is switched from the lowest flow rate position to the open position in a desired period of time. Thus, the flow control valve 109 can be switched from the lowest flow rate position to the open position while continuously increasing the flow rate. The flow rate can be changed smoothly from the initial supply to the main supply. Because the pressure in the vacuum chamber has already reached the predetermined pressure, rising of dust can be satisfactorily suppressed even when the inert gas flows toward the vacuum chamber at a high flow rate. Accordingly, the pressure in the vacuum chamber can be raised to the atmospheric pressure within a short period of time without raising dust.

What is claimed is:

1. A smooth vent valve, comprising
   a valve body having an inlet and an outlet,
   a flow path within the valve body communicating the inlet with the outlet for flow of a fluid in a downstream direction from the inlet to the outlet,
   an on-off valve in the flow path, the on-off valve including a main valve element,
   a flow control valve in the flow path in series with and downstream of the on-off valve, the flow control valve including a sub-valve element having a sub-valve shaft portion,
   an on-off valve actuator in the body for selectively cycling the on-off valve between a closed position and an open position,
   a flow control valve actuator in the body for selectively cycling the flow control valve between a throttling position and an open position so that when the on-off valve is in the open position, the flow control valve can be switched from the throttling position to the open position and thereby change the rate of fluid flow along the flow path from the inlet to the outlet from a slower rate to a higher rate, and
   a sub-shaft bellows provided around the sub-shaft portion of the sub-valve element, the sub-shaft bellows being connected at one end thereof to the sub-valve element and being connected at the other end thereof to the main valve element.

2. The smooth vent valve according to claim 1, wherein the on-off valve has an annular on-off valve seat, the main valve element includes a main shaft portion, the main valve element is connected by the main shaft portion to an annular main piston of the on-off valve actuator, the flow control valve has a sub-valve seat and the shaft portion of the sub-valve element extends through the main valve seat, the main valve element and the main piston of the on-off valve and is connected to a sub-piston of the flow control valve actuator.

3. The smooth vent valve according to claim 2, and further comprising a main shaft bellows provided around the main valve element and the main shaft portion, the main shaft bellows being connected at one end thereof to an inside of the valve body and being connected at the other end thereof to the main valve element.

4. The smooth vent valve according to claim 2, and further comprising a hollow adjusting screw rotatably and axially immovably connected to a cover provided at an end of the valve body, the hollow adjusting screw having an internal thread portion; an adjusting member having an external thread portion engaged with the internal thread portion of the hollow adjusting screw, the adjusting member being connected to the sub-piston in such a manner as to be unable to rotate relative to the sub-piston and unable to detach from the sub-piston; and a sub-spring biasing the sub-valve element toward the on-off-valve, whereby the axial position of the sub-valve element relative to the sub-valve seat when the flow control valve is in the throttling position is adjustable by rotation of the adjusting screw so as to establish a predetermined slower rate of fluid flow.

5. The smooth vent valve according to claim 4, wherein the flow control valve has an annular sub-valve seat, and the sub-valve element has a V-shaped groove in an end surface thereof.

6. The smooth vent valve according to claim 1, wherein the main valve element has a main shaft portion and further comprising a main shaft bellows provided around the main valve element and the main shaft portion, the main shaft bellows being connected at one end thereof to an inside of the valve body and being connected at the other end thereof to the main valve element.

7. The smooth vent valve according to claim 1, wherein the flow control valve has an annular sub-valve seat, and the sub-valve element has a V-shaped groove in an end surface thereof.

8. The smooth vent valve according to claim 1, wherein the on-off valve is annular and has an annular main valve seat provided at a position opposite to the main valve element and the flow path includes a first passage upstream from the on-off valve and a second passage downstream from the on-off valve, and further comprising a diaphragm seal secured at an inner peripheral edge thereof to the main valve element of the on-off valve and at an outer peripheral edge thereof to the valve body so that when the main valve element is in contact with the main valve seat communication between the first passage and the second passage is cut off and when the main valve element is out of contact with the main valve seat the first passage and second passage are communicated with each other.

9. The smooth vent valve according to claim 8, wherein the valve body includes a first body portion and a bonnet arranged in adjacent relation, the first body portion having an O-ring groove on an outer periphery at one end thereof, the bonnet having a slant abutment surface at an end thereof that is opposite to the one end of the first body portion, an O-ring seal and an outer peripheral edge of the diaphragm seal are clamped between the O-ring groove and the slant abutment surface.

10. The smooth vent valve according to claim 8, wherein the main valve element is connected to an annular main piston of the on-off valve actuator by an annular main shaft portion of the main valve element, and the sub-valve element has a sub-shaft portion that extends through the main valve seat, the main valve element, the main shaft and main piston of the on-off valve and is connected to a sub-piston of the flow control valve actuator.

11. The smooth vent valve according to claim 10, wherein the on-off valve is cycled by adjusting a pressure acting on the main piston of the on-off valve actuator, and the flow control valve is cycled by adjusting a pressure acting on the sub-piston of the flow control valve actuator.

12. The smooth vent valve according to claim 10, wherein the valve body has a body portion and a bonnet, the body portion has an O-ring groove on an outer periphery at one end thereof, the bonnet has a slant abutment surface at an end thereof that is opposite to the one end of the body, and an O-ring seal and an outer peripheral edge of the diaphragm seal are clamped between the O-ring groove and the slant abutment surface, and wherein the on-off valve is controlled by adjusting a pressure acting on the main piston, and the flow control valve is controlled by adjusting a pressure acting on the sub-piston.

* * * * *